April 5, 1927.
A. O. ERICKSON
SPRING TOOL
Filed June 5, 1926
1,623,401
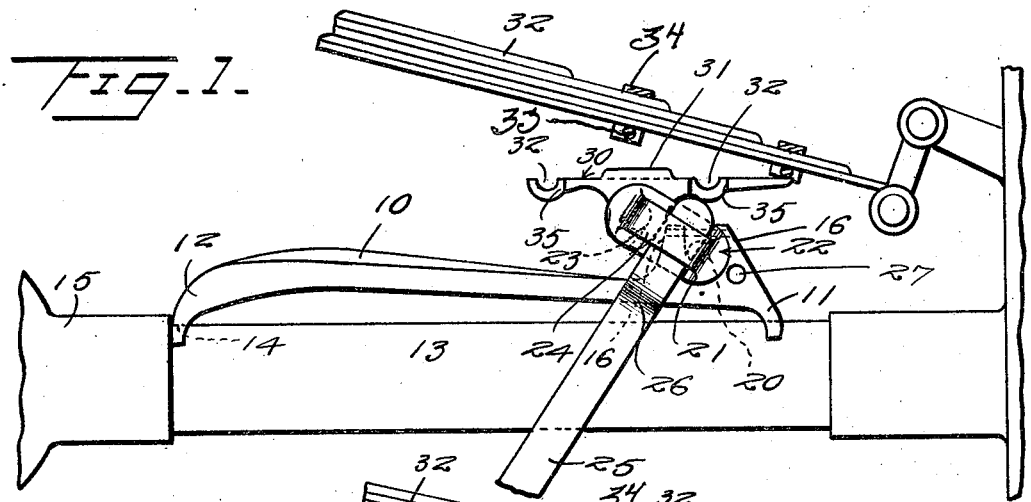
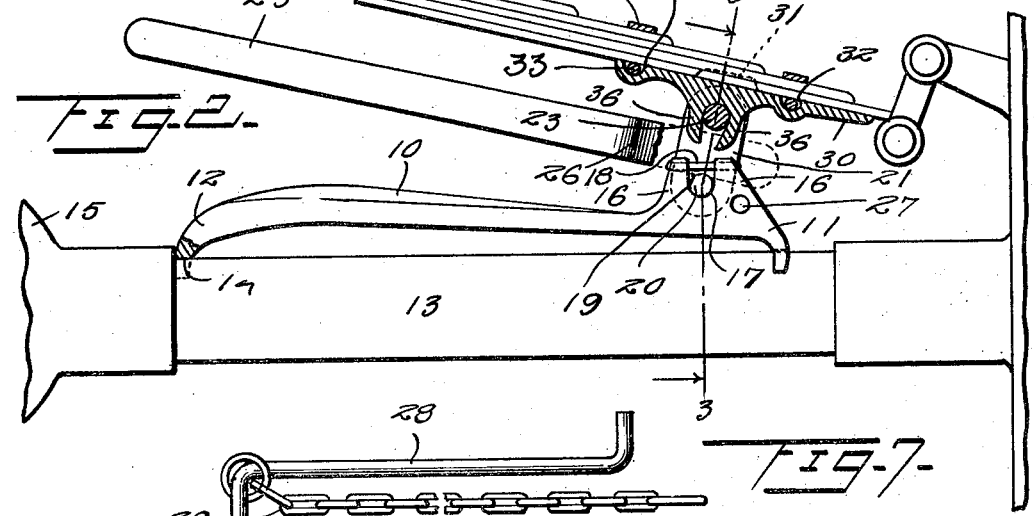
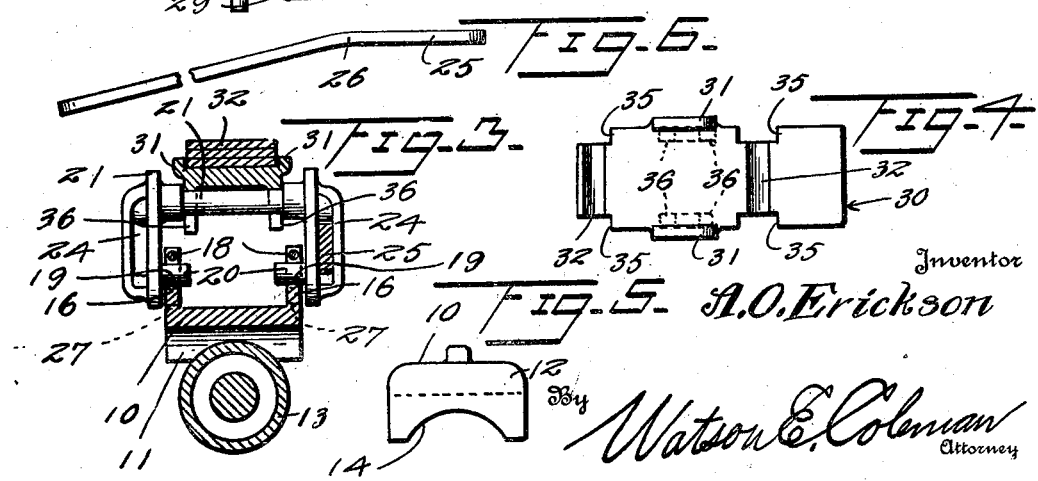
Inventor
A. O. Erickson
By Watson E. Coleman
Attorney Patented Apr. 5, 1927.

1,623,401

UNITED STATES PATENT OFFICE.

ALBERT O. ERICKSON, OF JASPER, MINNESOTA, ASSIGNOR OF ONE-HALF TO KNUTE WOLD, OF JASPER, MINNESOTA.

SPRING TOOL.

Application filed June 5, 1926. Serial No. 113,930.

This invention relates to spring tools and more particularly to a device for supporting the springs of a certain type of automobile to relieve strain placed thereby on the shackle bolts, so that these shackle bolts may be removed or replaced.

In the type of vehicle referred to, the springs extend above the axle paralleling the axle and are secured at their ends to shackle bolts carried by the axle. These springs, when released from their shackle bolts, have a tendency to move inwardly and downwardly and are difficult to properly align when new shackle bolts are to be inserted or to support when the old shackle bolts are to be removed.

An important and specific object of this invention is to produce a device for supporting the spring capable of relieving the tension of the spring which is brought to bear against the shackle bolt and of such construction that it is self-locking in its spring supporting position in which the tension upon the shackle bolt is relieved.

A still further object of the invention is to provide a device of this character which may be very readily and cheaply produced, which will be durable and efficient in service and a general improvement in the art.

A further object of the invention is to provide a device of this character which may be readily applied to and secured in position upon either the front or rear axle of a vehicle beneath the spring thereof.

These and other objects I attain by the construction shown in the accompanying drawings, wherein for the purpose of illustration is shown a preferred embodiment of my invention and wherein:—

Figure 1 is a side elevation showing a tool constructed in accordance with my invention in position ready to engage with a spring of the vehicle;

Figure 2 shows the tool engaged and in the spring supporting position, parts being broken away to illustrate the construction;

Figure 3 is a section on the line 3—3 of Figure 2;

Figure 4 is a plan view of the spring engaging plate;

Figure 5 is a rear end elevation of the axle engaging bar;

Figure 6 is a plan view of the handle;

Figure 7 is a view of the retaining element employed for attaching the tool to axles which do not have enlargements.

Referring now more particularly to the drawings, the numeral 10 generally designates a base plate having at its ends downturned flanges 11 and 12 for engagement with the axle 13 of a vehicle. The flange 12 is provided with an arcuate notch 14, so that it may accommodate the cylindrical housings 13ª of the rear axles of the vehicle and have its outer face abutting against the differential housing 15 of this rear axle.

Adjacent its opposite end, the base plate has extending upwardly therefrom at opposite sides thereof standards 16, which standards are provided in their upper faces with notches 17 closed by pins 18 to provide pivot openings 19 receiving pivot lugs 20 formed on the inner surface of spaced arms 21 of a link 22. The arms of the link are rigidly connected by a shaft 23 and the outer surface of each arm is formed with a socket 24 to receive the end of an operating bar 25. The end of the bar engaging in these sockets is slightly bent to one side, as at 26, so that the handle end of the bar is well spaced from the axle when the bar is in position. Each standard has further formed therein an opening 27, one of these openings receiving an arm 28, the free end of which has a chain 29 or equivalent flexible element attached thereto and adapted for passage about the axle of a vehicle to secure the same against movement where the inner end of the base plate cannot conveniently be arranged against some obstruction. A spring engaging plate 30 is provided, this plate being formed at its side face with upstanding lugs or flanges 31 adapted to engage opposite side faces of a spring 32 to prevent transverse displacement of the plate 30 with relation to the spring. This plate is further formed with transversely extending grooves 32 for the reception of connection bolts 33 of spring clips 34 and the sides of the plate in alignment with the grooves are notched, as at 35, for the reception of the clips themselves. The under surface of this plate has at its side edges depending pairs of lugs 36 adapted to receive therebetween the shaft 23 of the link 22, the ends of the lug being bent about the shaft to prevent separation of the link and spring engaging plate.

In the use of the device, the bar 10 is placed in position upon the axle with its flanges 11 and 12 in engagement with the axle. If the spring above the rear axle is being operated upon, the flange 12 fits upon the curved housing and abuts against the differential housing of the rear axle, thus holding the bar against movement, while if the spring above the front axle is being operated upon, the bar is held against movement by engaging the chain 29 with the axle. The handle 25 is then placed in position and employed to rotate the link 22, so that the spring engaging plate 30 comes into contact with the spring and the clip bolts of the spring engage in the grooves 32 thereof. Continued operation of the handle bar will cause the spring to be elevated and the tension placed thereby upon the spring shackle S relieved, so that the bolts of the shackle may be readily removed. At a point where the shackle bolts are relieved and free in the openings in which they are provided, the handle bar is substantially horizontally disposed and automatically locked in position. It is pointed out at this time that there are two forces working upon the plate 22, one tending to move this plate downwardly and the other to move the plate inwardly and at this time, the pivot shaft 23 is arranged outwardly of the pivot openings 19, with the result that the downward movement has a tendency to raise the handle bar, while the inward movement has a tendency to lower the same. Thus, these two forces counteract and the plate and handle remain stationary. Necessity for holding the lever is thus eliminated and the operator is able to give his full attention to the removal and replacement of the shackle bolts.

It will, of course, be understood that the construction hereinbefore set forth is obviously capable of a certain range of change and modification without materially departing from the spirit of the invention and I accordingly do not limit myself to such specific structure except as hereinafter claimed.

I claim:—

1. A spring tool for supporting the springs of vehicles in which the springs are directed transversely of the vehicle and overlie the axle thereof, said tool comprising an axle engaging bar adapted to engage the axle beneath the spring and a spring engaging plate overlying the axle engaging bar and connected thereto by a link pivoted to each thereof, said spring engaging plate having at its side edges ears for engaging the side edges of the spring to prevent displacement of the plate with relation to the spring and a lever operatively engaged with said bar and plate for shifting the spring engaging plate to move the same into or out of engagement with the spring, the plate having transverse grooves for the reception of the clip bolts of the spring.

2. A spring tool for supporting the springs of vehicles in which the springs are directed transversely of the vehicle and overlie the axle thereof, said tool comprising an axle engaging bar adapted to engage the axle beneath the spring and a spring engaging plate overlying the axle engaging bar and connected thereto by a link pivoted to each thereof, said spring engaging plate having at its side edges ears for engaging the side edges of the spring to prevent displacement of the plate with relation to the spring and a lever operatively engaged with said bar and plate for shifting the spring engaging plate to move the same into or out of engagement with the spring, the link having a socket in which an end of the lever is engaged.

3. A spring tool for supporting the springs of vehicles in which the springs are directed transversely of the vehicle and overlie the axle thereof, said tool comprising an axle engaging bar adapted to engage the axle beneath the spring and a spring engaging plate overlying the axle engaging bar, a link connecting the bar and plate, said link including spaced arms, the bar having spaced bearings receiving inwardly directed lugs formed upon the lower ends of said arms, a shaft rigidly connecting the upper ends of the arms and bearings upon the under surface of the spring engaging plate for said shaft, together with a lever for operatively engaging said link to shift the link and spring engaging plate to move the spring engaging plate into or out of engagement with the spring.

4. A spring tool for supporting the springs of vehicles in which the springs are directed transversely of the vehicle and overlie the axle thereof, said tool comprising an axle engaging bar adapted to engage the axle beneath the spring and a spring engaging plate overlying the axle engaging bar, a link connecting the bar and plate, said link including spaced arms, the bar having spaced bearings receiving inwardly directed lugs formed upon the lower ends of said arms, a shaft rigidly connecting the upper ends of the arms and bearings upon the under surface of the spring engaging plate for said shaft, together with a lever for operatively engaging said link to shift the link and spring engaging plate to move the spring engaging plate into or out of engagement with the spring, each arm of the link having a socket for the reception of an end of said lever.

5. A spring tool for supporting the springs of vehicles in which the springs are directed transversely of the vehicle and overlie the axle thereof, said tool comprising an axle engaging bar adapted to engage the axle beneath the spring and a spring engaging plate overlying the axle engaging bar, a link connecting the bar and plate, said link including spaced arms, the bar having spaced bearings receiving inwardly directed lugs formed upon the lower ends of said arms, a shaft rigidly connecting the upper ends of the arms and bearings upon the under surface of the spring engaging plate for said shaft, together with a lever for operatively engaging said link to shift the link and spring engaging plate to move the spring engaging plate into or out of engagement with the spring, the spring engaging plate having at its side edges ears for engaging the side edges of the spring to prevent displacement of the plate transversely of the spring.

6. A spring tool for supporting the springs of vehicles in which the springs are directed transversely of the vehicle and overlie the axle thereof, said tool comprising an axle engaging bar adapted to engage the axle beneath the spring and a spring engaging plate overlying the axle engaging bar, a link connecting the bar and plate, said link including spaced arms, the bar having spaced bearings receiving inwardly directed lugs formed upon the lower ends of said arms, a shaft rigidly connecting the upper ends of the arms and bearings upon the under surface of the spring engaging plate for said shaft, together with a lever for operatively engaging said link to shift the link and spring engaging plate to move the spring engaging plate into or out of engagement with the spring, the spring engaging plate having at its side edges ears for engaging the side edges of the spring to prevent displacement of the plate transversely of the spring and means engaging the clip bolts of the spring for preventing displacement of the plate longitudinally of the spring.

In testimony whereof I hereunto affix my signature.

ALBERT O. ERICKSON.